United States Patent [19]

Guterman et al.

[11] Patent Number: 5,123,618

[45] Date of Patent: Jun. 23, 1992

[54] CABLE TRAY

[76] Inventors: Douglas E. Guterman, 11 Longacre Dr.; Gustav H. Lengenfelder, 3 Mimosa La., both of Huntington, N.Y. 11743

[21] Appl. No.: 760,702

[22] Filed: Sep. 16, 1991

[51] Int. Cl.⁵ .............................................. F16L 3/22
[52] U.S. Cl. ...................................... 248/49; 248/68.1
[58] Field of Search ................. 248/49, 68.1; 182/100, 182/189, 228

[56] References Cited

U.S. PATENT DOCUMENTS

| | | | |
|---|---|---|---|
| 2,594,561 | 4/1952 | Huek | 182/228 |
| 3,042,351 | 7/1962 | Du Bois . | |
| 3,363,048 | 1/1968 | Vaughn . | |
| 3,680,817 | 8/1972 | Gogan | 248/684 |
| 3,713,613 | 1/1973 | Searls | 248/49 |
| 3,915,420 | 10/1975 | Norris . | |
| 3,948,473 | 4/1976 | Mason . | |
| 4,046,343 | 9/1977 | Kambara | 248/49 |
| 5,004,194 | 4/1991 | Handler . | |

OTHER PUBLICATIONS

Mono-Systems, A revolutionary new system for cable Trays, Jul. 1967, pp. 6 & 16.

*Primary Examiner*—Alvin C. Chin-Shue
*Attorney, Agent, or Firm*—Galgano & Belkin

[57] ABSTRACT

A cable tray comprising an extended spine having spaced, parallel arranged rungs extending therefrom for carrying cables. Hangers are employed to suspend the spine from a ceiling. The spine comprises an extended hollow member and a hollow base integral with each other. Each rung passes through the base and is detachably connected to the base at the opposite side. Each rung extends from the base for supporting the cables. Rungs extend from both sides of the base and are staggered so that they can readily be removed and/or replaced. There is also described a double spine arrangement for a larger number of cables and a wall mounted configuration utilizing a bracket to support the spine and base.

7 Claims, 4 Drawing Sheets

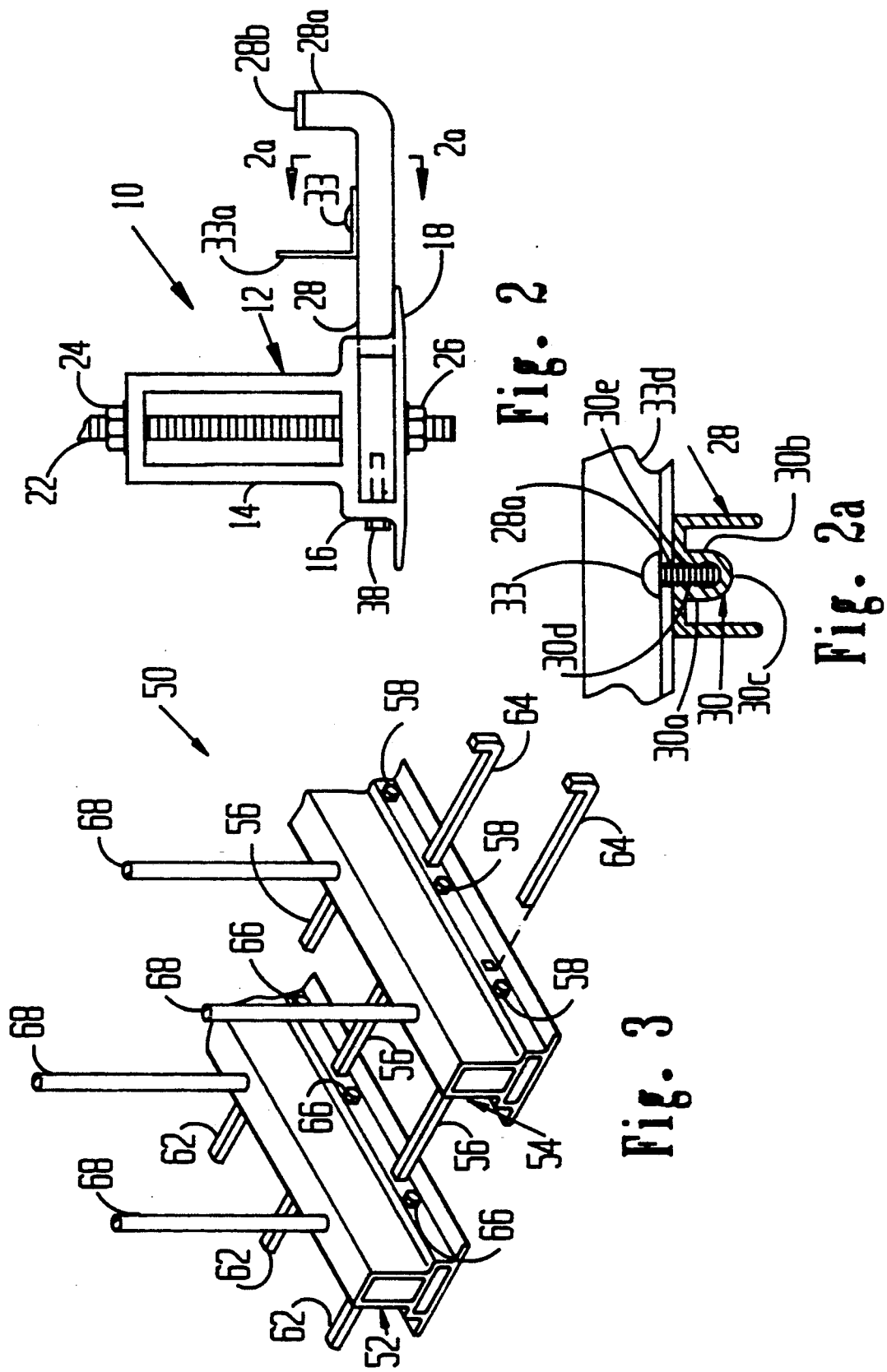

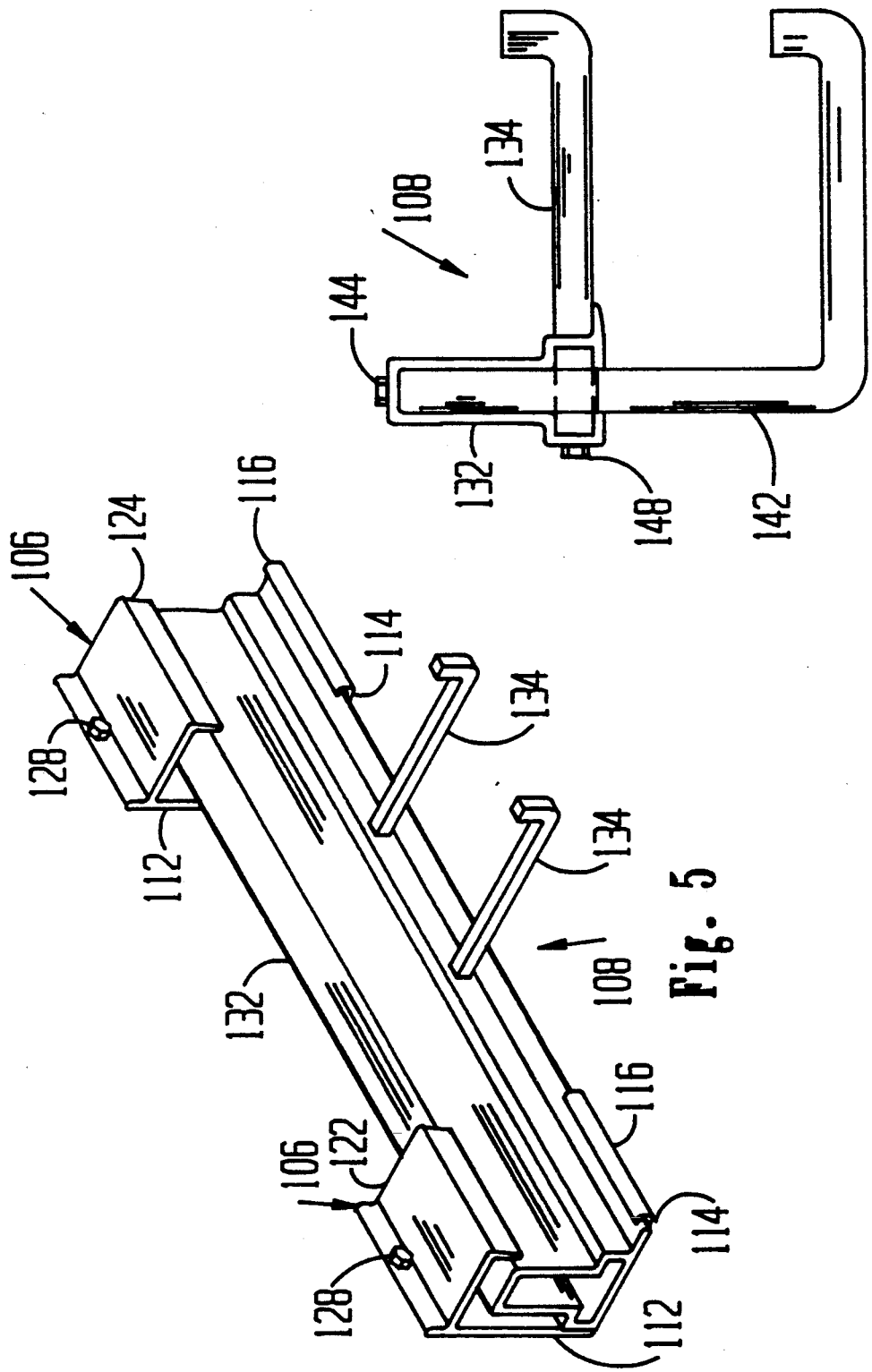

CABLE TRAY

BACKGROUND OF THE INVENTION

The present invention relates to a cable tray and more particularly to a cable tray with readily removable and replaceable rungs while in service.

Cable trays are devices mounted on walls or suspended from ceilings for carrying cables such as for communications, computers, power transmission, etc.

Cable trays now in use suffer a variety drawbacks. Their construction very often is complex or expensive. All of them lack the ability to alter their capacity once in place, are difficult to mount in tight locations, are impossible to replace damaged rungs, or to change the length of a rung when required.

A number of United States Patents have been issued which show designs of cable trays now in use or known.

U.S. Pat. No. 3,042,351 discloses a basket shaped tray in which lengths are joined in a novel connecting arrangement.

U.S. Pat. No. 3,363,048 shows a cable supporting tray employing a central spine with rungs going through spines and crimped into place at top of the spines.

U.S. Pat. No. 3,915,420 describes a cable tray made of ladder-like sections which are interlocked together.

U.S. Pat. No. 3,948,473 discloses a universal cable rack made of extended side stringers on top of which are mounted crossover members.

U.S. Pat. No. 5,004,194 describes a side supported cable tray made of sheet metal formed into a U-shape using slots to support the edges of a side wall which is adjustable.

None of the preceding patents teaches the present invention.

SUMMARY OF THE INVENTION

This invention relates generally to cable trays as a support system for carrying electrical cables, wires, conduits or tubing and piping horizontally and vertically over varying distances allowing cooling air to circulate about them and offering accessibility to them, and more particularly to this cable tray with its readily interchangeable, removable and replaceable rungs while installing and/or later while in service, while offering easy field alterations in tray length, rung sizing and mounting of tray without the need of special tools or jigs, etc. to complete the installation.

The primary object of this invention is to be able to remove rungs from the spine or purchase units unassembled which will allow the installer better and easier accessibility into very close or tight installation spaces, then assembling the individual rungs into the spines punched spaces provided after the spine has been mounted.

Another object of this invention is to provide the installers with the ability to select and change to a variety of sizes in rungs as field installation obstructions are encountered.

A still further object of this invention is to provide the ability to replace the rung when damage in shipping or installation occurs. Also, to interchange the rungs at a later date after the tray has been in service, to gain an increase in cable, etc., capacity. But in so doing not having to remove the cables, etc., or the entire tray system.

A still further object is the design of a rectangular vertical tubing structure for overall carrying strength over the full length or spine of the tray coupled with a diametrically opposed horizontal rectangular tube with extended wings, which forms an elongated support surface to the rung. This offers much more rung support, preventing loading deflection of rungs. Both these tubing units, plus the wings being formed and extruded into one unit called the spine.

Another object is the taking of two spines in parallel with rungs between forming a cable tray, commonly known as ladder type tray, but the uniqueness of the spine design allows a future expansion of tray carrying capacities by having access spaces in the outboard sides of the spine allowing placement of extra rungs to extend on outboard sides of the spine forming outridgers and increasing the serviceable area two and threefold—all done without having to perform major surrounding area modifications, reconstruction of area or even the removal and replacement of cable tray system or its contents.

Other objects and advantages of this invention will hereinafter become obvious from the following description of preferred embodiments of this invention.

BRIEF DESCRIPTION OF THE DRAWINGS

FIG. 2 is an end view of the cable tray shown in FIG. 1.

FIG. 2a is a section view taken along 2a—2a of FIG. 2.

FIG. 3 is an isometric, partially exploded view of an alternative embodiment of this invention.

FIG. 5 is an isometric view of a cable tray assembly utilizing the wall bracket shown in FIG. 4.

FIG. 8 is an end view partially schematic of still another embodiment of this invention. Double tier wall tray which will use the same mounting bracket as shown in FIG. 4.

DESCRIPTION OF THE PREFERRED EMBODIMENTS

Figure 1:
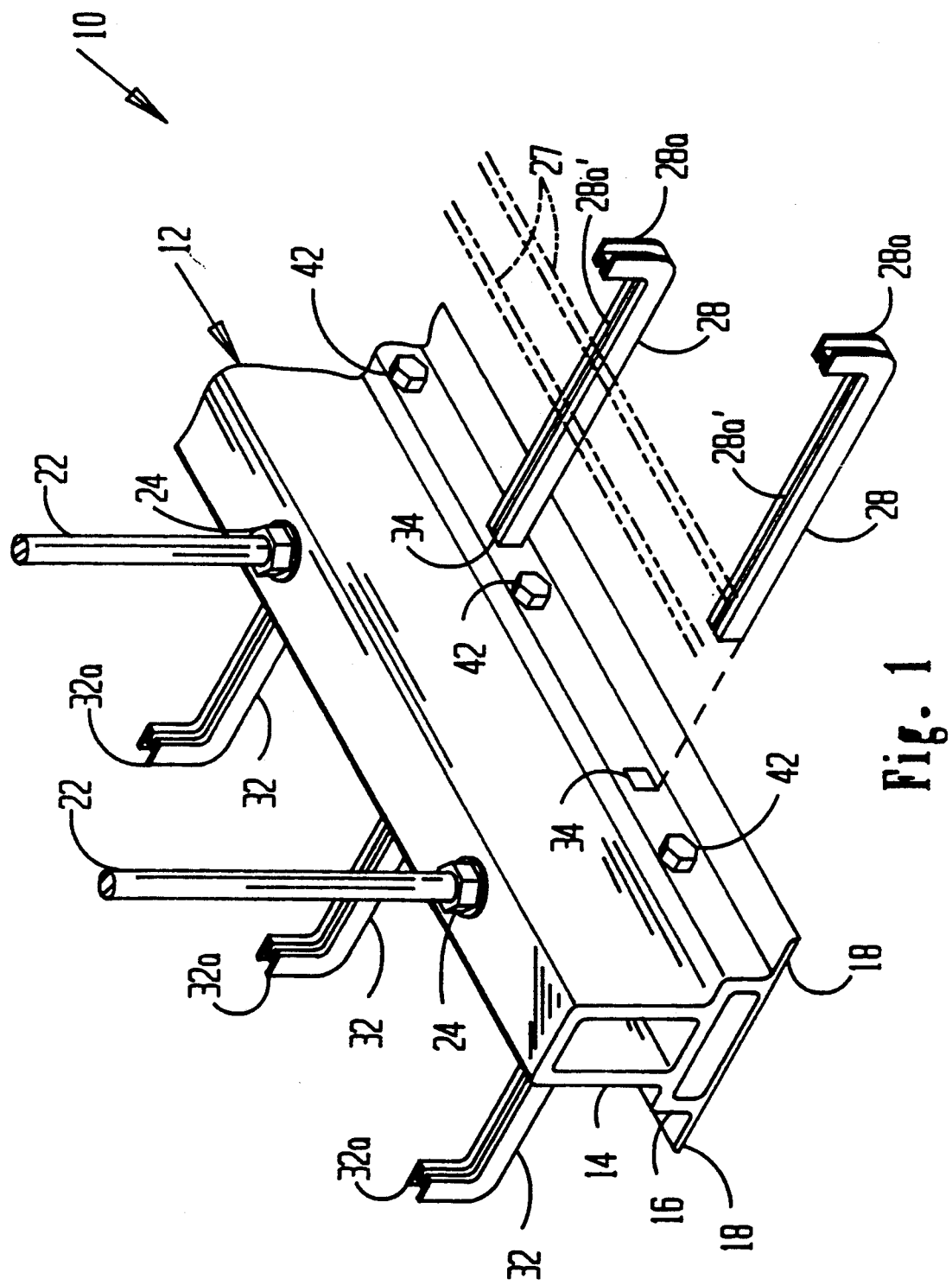
FIG. 1 is an isometric view partially exploded of a preferred embodiment of this invention.

Referring to FIGS. 1, 2 and 2a, cable tray 10 comprises an extended spine member 12 which may be made of extruded aluminum, steel, rolled steel, exotic metals, or suitable rigid plastic as is understood in the art. Spine member 12 in section appears as an inverted T with a hollow body 14, a hollow base 16, and shoulders or wings 18 extending outwardly as illustrated. It will be seen that the long sectional dimensions of body 14 and base 16 are at right angles with each other, which provides extra rung support as to be described.

Spine member 12 would be suspended from a ceiling and supported by threaded hanging rods 22. Each rod 22 passes through spine member 12 as more particularly seen in FIG. 2. A pair of nuts and washers 24 and 26 may be employed to attach spine member 12 to rods 22 or they can be mounted with the threaded rods going through a splice connector (not shown) which connects the lengths of said spine together forming a continuous run.

To support cables 27, shown in phantom, a number of spaced, parallel arranged, horizontally disposed rungs 28 and 32 extend outwardly from both sides, respectively, of spine member 12. It will be seen from FIG. 1 that rungs 28 on one side are staggered from rungs 32 on the other side of spine member 12. Rungs 28 and 32, which may be U-shaped in cross section, as seen in FIG. 2a, typically would be bent at the ends to form fingers 28a and 32a, respectively, to help contain the cables, and the tips may be provided with plastic end caps such as cap 28b shown in FIG. 2.

As seen in FIG. 2a, rung 28, while generally U-shaped as noted, has a center column 30 made up of a pair of side walls 30a and 30b joined at the bottom with a circular section 30c and forming a slot 28a' along the top surface of each rung. The facing surfaces of side walls 30a and 30b are provided with grooves 30d and 30e which permit screw members 33 to be threaded into the space between side walls 30a and 30b through slot 28a' as seen in FIGS. 2 and 2a. Screw members 33 can be employed to support an L-shaped divider 33a running down the length of tray 10 (vertical to rungs 28), and screw members 33 can be placed anywhere along the lengths of rungs 28 through slot 28a'. Rungs 32 are of similar construction. The broad width of rungs 28 and 32 helps minimize the possible cold flow of cable insulation.

This arrangement of rungs 28 and 32 permits each rung to be attached individually permitting the removal and/or replacement of individual rungs. As seen in both FIGS. 1 and 2, and FIG. 2 in particular, rung 28 extends through an opening 34 in one side wall of base 16 and terminates flush with the other side wall of base 16. A hex head screw 38 is threaded through the side wall of base 16 and into the end of center column 30 thereby securing rung 28 in place.

In a similar manner, rungs 32 on the other side of spine member 16 pass through base 16 and are attached to the opposite side wall by hex head screws 42.

It will be seen that shoulder 18 which extends outwardly and under rungs 28 and 32 provide additional support to prevent or limit sagging of rungs 28 and 32 under load.

From the construction just described it will be seen that individual rungs 28 and 32 can be readily removed and replaced in the event of damage. Also, in the event cable tray 10 is being mounted in an area where it would be difficult or impossible to put it in place because of interference, the rungs can be mounted after tray 10 is suspended in place. Rungs 28 and 32 can also be varied in length and changed while tray 10 is in use.

It is understood that cable tray 10 as illustrated is one section which may be of suitable length with a number or rods 22 and rungs 28 and 32. A number of sections would be lined up in tandem along the route of the cables as is understood in the art. In addition, some sections of cable tray 10 can be curved to go around corners, and the lengths may be varied for particular applications.

Under some circumstances where the number of cables to be supported will exceed the capacity of cable tray 10 shown in FIGS. 1 and 2, the cable tray 50 shown in FIG. 3 may be employed. Tray 50 consists of a pair of spine members 52 and 54 identical to spine member 12 shown in FIGS. 1 and 2, and joined by straight rungs 56. Rungs 56 pass through the respective bases of spine members 52 and 54 and are joined by screws such as screws 58 in spine member 54.

Outrigger rungs 62 and 64 identical to rungs 28 and 32 shown in FIGS. 1 and 2 pass through and are attached to the bases of spine members 52 and 54 in the manner previously described, as shown by screws 66 joining the ends of rungs 62. Hanging rods 68 identical to rods 22 in FIGS. 1 and 2 and attached in the same manner support cable tray 50.

The arrangement of FIG. 3 has all of the advantages of the configuration of FIGS. 1 and 2 plus has the additional capacity as earlier noted.

The embodiments already described are supported by suspension from the ceiling using typically ½" threaded rods. The present invention can be adapted for wall mounting, as shown in the embodiment illustrated in FIGS. 4–7.

Mounted on wall 102 is a cable tray assembly 104 comprising a wall bracket 106 which may be made of extruded aluminum or other materials as previously described and a cable tray 108.

Bracket 106 comprises a side wall 112, a leg 114 with a lip 116 along the outer edge terminating in a shoulder 118 for a purpose to be described. An extended shelf 122 extends out from side wall 112 located near the top of the latter terminating in a downwardly extending lip 124. A hole 126 in wall 112 above shelf 122 permits the use of a proper anchoring method such as an anchor with a bolt, a lag screw, even a power actuated stud or threaded rod all shown as member 128. For insertion in wall bracket 106, cable tray 108 comprises a spine member 132 and a plurality of rungs 134 identical to rungs 28 and 32 illustrated in FIGS. 1 and 2. Spine member 132 consists of a vertical wall section 136 and an integral, hollow base section 138 with vertical end walls 142 and 144, and a single toe like projection or shoulder 146 extending along one edge of base section 138.

Rungs 134 are attached to base section 138 using screws 148 passing through wall 142 for attachment to the end wall closing off the end of rung 134 as previously described.

Figure 7:
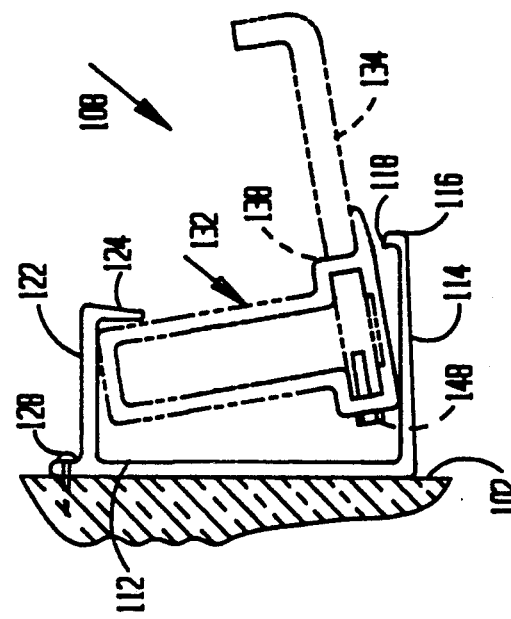
FIG. 7 is a view similar to FIG. 6 showing how the cable tray is inserted into the wall bracket.
Figure 6:
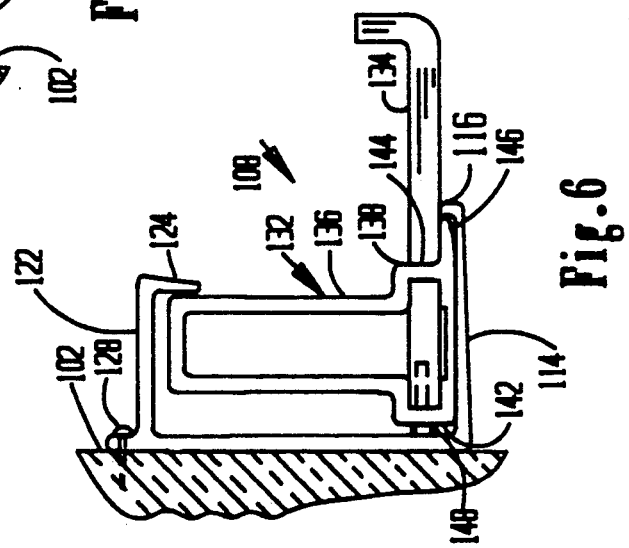
FIG. 6 is an end view of the wall bracket with the cable tray in place.
Figure 4:
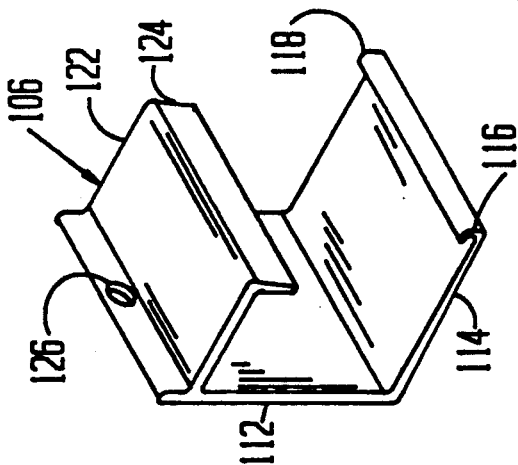
FIG. 4 is as an isometric view of a wall tray bracket employed in still another embodiment of this invention.

To mount cable tray assembly 108, one or more brackets 106 would be first mounted on wall 102, and then, as illustrated in FIGS. 6 and 7, spine member 108 would be inserted into bracket 106 so that toe-like projection 146 would be snapped in under shoulder 118. In this arrangement, as in the preceding embodiments described, rungs 134 are readily removeable and/or replaceable.

As seen in FIG. 5, a plurality of brackets 106 would be mounted along a wall and lengths of cable tray 108 would be inserted into brackets 106 as described.

Another layer of rungs may be added to cable tray 108, as illustrated in FIG. 8. Spine member 132 would be provided with knockouts on the top and bottom at spaced intervals to permit L-shaped rungs 142 to be inserted as illustrated and joined by a hex head screw 144. Excepts for its L-shape, the construction of rungs 142 is identical to that of rungs 134, thereby permitting a two tier structure to hold cables and the like.

It is thus seen there has been provided unique cable tray arrangements embodying the principles of this invention in which capacity can be varied simply by replacing rungs, damaged rungs can be simply replaced, and space problems can readily be overcome by inserting rungs after a portion of the tray has been mounted in place.

It will be seen that the cable trays as herein described have a variety of advantages of those in use up to now. In the event any rungs are damaged due to improper handling during shipment or installation, the cable tray system can still be installed as the cable tray system will not prevent the installation for repair or replacement as any of the bent rungs can be replaced at a later date either before of after the cable has been installed into the system.

Furthermore, this tray system can be shipped unassembled at a less expensive rate or freight and taking up less space, allowing easier handling, storage, and a quicker response time on delivery. Stocking of the unassembled tray reduces the cubic area of storage and allows the tray parts to be available out of stock offering next day out the door delivery.

With respect to the wall mounted cable tray system, future installation of outboard or outrigger rungs can be made available as an option by having the holes for both the lock screw and the universal rectangular rung holes prepunched to later accept the rungs. This again allows for future increases in the existing cable tray carrying capacities without changing, removing or adding another parallel tray system.

Also in using the spine of the suspended configuration shown in FIGS. 1 and 2 along with one side mounting of the rungs in the bottom horizontal compartment and by removing the back wing, this tray can in effect be made into the a wall mounted cable tray. With rungs mounted in the bottom horizontal compartment and the back wing being removed another rung can be placed through the bottom horizontal compartment but in a vertical mounting which will carry up into the vertical compartment and be screw mounted at the top of the vertical compartment the other end shall extend down from the spine and have a formed 90 degree bend outward under the upper tier of rung and at various distances but again bent to 90 degrees forming a basket of the lower rung, now forming the double tier wall mounted tray.

The wall mounted tray can be very easily mounted onto the wall by using the specially designed wall mounted bracket which allows quick and easy mounting of the brackets on any surface or wall by only a single person. The lightweight design of this wall mounted tray can simply be lifted into place within the three brackets for each length and snapped into place which automatically locks said tray into bracket and onto the wall. Also due to this simple snap in or out feature of mounting the tray within the bracket it allows interchangeability replacement of the rungs.

While only certain preferred embodiments of this invention have been described it is understood that many variations are possible without departing from the principles of this invention as defined in the claims which follow.

What is claimed is:

1. A cable tray comprising:
   a. extended spine means having spaced, parallel arranged outrigger rungs extending therefrom for carrying cables;
   b. means for supporting said spine means;
   c. said spine means comprising an extended spine and base means below said spine integral with each other;
   d. each rung passing through one side of said base means removably connected to said base means at the opposite side thereof, said rung extending from said base means for supporting said cables;
   e. said supporting means engaging said spine;
   f. said base means being a hollow extended member wider in cross section than said spine and having extended end walls, each said rung passing through one of said end walls and terminating adjacent the opposite end wall, and screw means for detachably connecting said rung to the opposite end wall of said hollow extended member; and
   g. shoulder means extending from the bottom of said hollow extended member in the direction of said rungs providing additional support for said rungs.

2. A cable tray comprising:
   a. extended spine means having spaced, parallel arranged rungs extending therefrom for carrying cables;
   b. means for supporting said spine means;
   c. said spine means comprising an extended spine and base means integral with each other;
   d. each rung passing through one side of said base means removably connected to said base means at the opposite side thereof, said rung extending from said base means for supporting said cables; and
   e. said supporting means engaging said spine; and
   f. said base means being a hollow extended member having extended end walls, each said rung passing through one of said end walls and terminating adjacent the opposite end wall, screw means for detachably connecting said rung to the opposite end wall of said hollow extended member, each rung in cross section being U-shaped with the legs extended downwardly and having within a center column between the legs and a slot along the top surface of said rung for permitting access to said center column.

3. The cable tray of claim 2 in which said screw means engages said center column.

4. The cable tray of claim 3 having means on said rungs extending at right angles to the lengths of said rungs forming a divider, and means for attaching said divider to said rungs comprising screw members passing through said divider into said slot to engage said center column.

5. The cable tray of claim 2 in which said rungs and shoulder means extend from both sides of said hollow extended member, the rungs on opposite sides of said extended member being staggered so that one end of each rung can be removably attached to the opposite side wall of said extended member.

6. The cable tray of claim 5 in which said supporting means comprises spaced hanging rods extending down from a building structure passing completely through said spine means and having means at the bottom thereof for supporting said cable tray.

7. A cable tray comprising:
   a. first and second parallel, spaced extended spine means having spaced parallel straight rungs joining said first and second spine means;
   b. spaced, parallel outrigger rungs extending from said first and second extended spine means;
   c. each said spine means comprising an extended spine and a hollow, extended base member integral with and below said spine having extended side walls, said extended base member being wider in cross section than said spine;
   d. each outrigger rung passing through one of said side walls and terminating adjacent the opposite end wall of its respective base member, and screw means for detachably connecting said rung to the opposite end of said hollow extended member; and
   e. means attached to both spines for supporting said cable tray.

* * * * *